Figure 1:
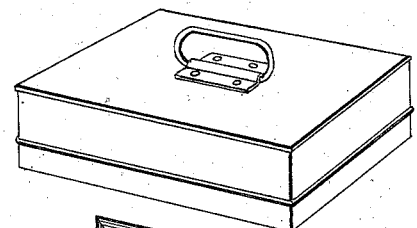
Figure 4:
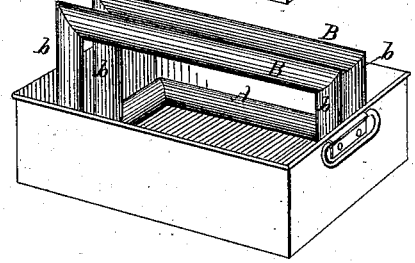
Figure 4:
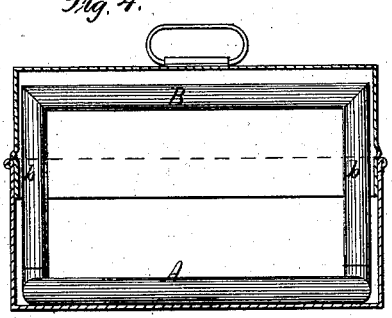
Figure 3:
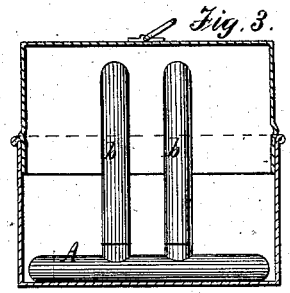
Figure 2:
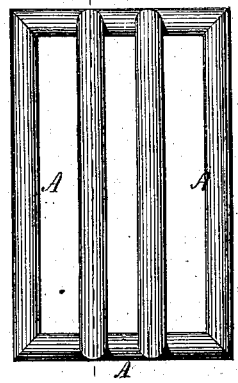

C. ROBERTS.
BAKE-PAN.

No. 192,840.        Patented July 10, 1877.

Witnesses:
A. H. Beseman
T. A. Beseman

Inventor
Charles Roberts

UNITED STATES PATENT OFFICE.

CHARLES ROBERTS, OF MOUNT PLEASANT, IOWA.

IMPROVEMENT IN BAKE-PANS.

Specification forming part of Letters Patent No. 192,840, dated July 10, 1877; application filed January 10, 1877.

*To all whom it may concern:*

Be it known that I, CHARLES ROBERTS, of Mount Pleasant, in the county of Henry and State of Iowa, have invented a new and Improved Method of Baking, Roasting, and Basting Meats; and I do hereby declare that the following is a full and exact description thereof, reference being had to the acompanying drawings and to the letters of reference marked thereon.

The nature of my invention consists in providing a reservoir or tubes containing water to be placed around or about the meat to be cooked, with which reservoir or tubes one or more other smaller tubes are connected, which rise up and pass over and above the meat, conveying heated steam from such reservoir up, over, above, and across the meat, said connecting-tubes being perforated on the under side with a suitable number of holes to permit the escape of steam over and upon the meat, and to permit the escape of particles of water upon the meat, the steam to promote the cooking and the steam and water to serve in basting the meat in the process of cooking, the whole apparatus, together with the meat to be baked, to be placed inside an iron, copper, or other suitable receptacle with a close-fitting lid, and of such size as may be suitable or adapted to the size of the joint of meat or fowl, and then placed in any ordinary oven, or heated upon the top of any stove.

To enable others skilled in the art to make and use my invention, I will proceed to describe its construction and operation.

I construct my box or receptacle to inclose my reservoir and tubes and meat in a cubical or other suitable form and size, and of Russia iron or other suitable material, and having a close-fitting lid of the same material. I then construct a reservoir, made of tin tubes or other suitable material, of about one inch in diameter, or greater, if necessary, so connected and soldered at their connections as to hold water and permit it to flow throughout.

This reservoir I place just outside the dripping-pan holding the meat, and on the bottom of the box or receptacle, closely fitting in near the walls of the box, and yet so free that it may be raised or taken out of the receptacle.

I then attach, on opposite sides of this reservoir, and connecting with it by an opening, two upright tubes of a smaller diameter; and in an apparatus for cooking a large piece I insert two or more tubes, as may be desirable, upon each of two opposite sides, and from two to four inches apart. These tubes I solder upon the reservoir, and leave the upper ends open. They may be from one to four or more inches in height, according to the size of the meat.

I next make another tube of the same diameter as the upright tubes, of the same material, having elbows at the ends turning down at right angles to the tube—these elbows to be of sufficient length to raise the tube to a height sufficient to admit the meat to lie between it and the dripping-pan. These elbows are to fit closely upon the upright tubes connecting with the reservoir, as a joint, and yet so as to be easily removed when placing in the meat.

More than one transverse tube is used, if it is desired, or if the joint of meat or fowl be large, there being one such transverse tube for each set of upright connecting-tubes. I then perforate the under side of this transverse tube its whole length, so as to permit the escape of the steam created by the heat of the oven.

Figure 6:
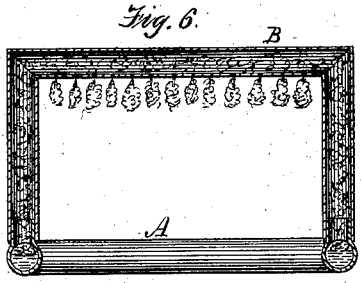
Figure 5:
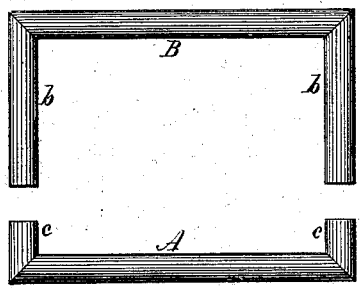

The reservoir, as shown at A in Figs. 1, 2, 3, 4, and 5, in the accompanying drawings, is first filled, or partially filled, with water, through the upright tubes C C, as shown in Fig. 5, and is placed within the box or receptacle, as shown at Fig. 1. A dripping-pan is then placed on the bottom of said box, just inside of the reservoir. The joint of meat or fowl is then laid in the pan, and then the transverse tubes are put in place, fitting the elbows over the upright tubes. The transverse tube is shown at B, in Figs. 1, 4, 5, and 6, in said drawings, and the elbows c c. The lid is then placed over and upon said box. The steam created in the reservoir is carried up the tubes and over the meat, and is cast downward upon the meat, and particles of water are forced out at the perforations, serving as a basting during the process of cooking, as shown in Fig. 6.

The meat is cooked much quicker than in the usual manner by the presence of the steam, and the basting is more regular and uniform than if done by hand. The meat will cook more thoroughly throughout than by any other mode, and the flavors and juices will be more completely preserved and retained within the meat.

I am aware that wash-boilers having a water-reservoir, and conduits leading therefrom up and over the contents of the boiler, for the purpose of conveying steam and water, which, after being discharged from said conduits, is returned to said reservoir, by which a continuous circulation of the water is kept up, have been constructed previous to my invention, and I do not claim to have invented such; but, inasmuch as there never has been, previous to my invention, an apparatus for basting meat, &c., consisting of an imperforate reservoir having a conduit for conducting the steam, &c., by which a spray is gradually thrown upon the meat, and which is not returned to the reservoir—

I claim as my invention—

1. The tubular frame or reservoir A A, having the upright tubes $b$ $b$ connected together by the perforated tubes B B, substantially as and for the purpose set forth.

2. The imperforate reservoir A $c$, in combination with an upright removable pipe, $b$, with a perforated extension, B, reaching over the contents of the pan, substantially as and for the purpose set forth.

CHARLES ROBERTS.

Witnesses:
  A. H. BESEMAN,
  T. A. BESEMAN.